455-501 AU 233 EX
FIP8106 XR 3,840,738

United States Patent
Indig et al.

3,840,738
[45] Oct. 8, 1974

[54] OPTICAL COMMUNICATIONS SYSTEM WITH MEANS FOR MINIMIZING MATERIAL DISPERSION

[75] Inventors: George Sanford Indig, Bernards Twp., Somerset County; Peter Michael Rentzepis, Millington, both of N.J.

[73] Assignee: Bell Telephone Laboratories, Murray Hill, N.J.

[22] Filed: May 9, 1973

[21] Appl. No.: 358,733

[52] U.S. Cl. .......... 250/199
[51] Int. Cl. .......... H04b 9/00
[58] Field of Search .......... 250/199; 307/88.3; 330/3.5; 332/7.51

[56] References Cited
UNITED STATES PATENTS

| | | | |
|---|---|---|---|
| 3,705,992 | 12/1972 | Ippen et al. | 307/88.3 |
| 3,717,769 | 2/1973 | Hubbard et al. | 250/199 |

*Primary Examiner*—Albert J. Mayer
*Attorney, Agent, or Firm*—G. S. Indig

[57] ABSTRACT

The bandwidth of an optical communications system utilizing a transmission line constructed of a dispersive medium is significantly increased by use of a particular type of repeater and/or detector. This element is of such design as to be sensitive to a spectral width which is only a minor fraction of the total spectral width of originally launched pulses or other amplitude peaks representing information introduced into the transmission line. An exemplary element utilizes a prism or grating which angularly displaces different frequency components of the peak together with a sensor of sufficiently small aperture to respond only to the energy contained in a small angular portion of the spread energy. The dispersion limit on bandwidth capability on a given transmission medium is accordingly increased by a factor equal to the reciprocal of the fraction represented by the spectral portion sensed.

21 Claims, 1 Drawing Figure

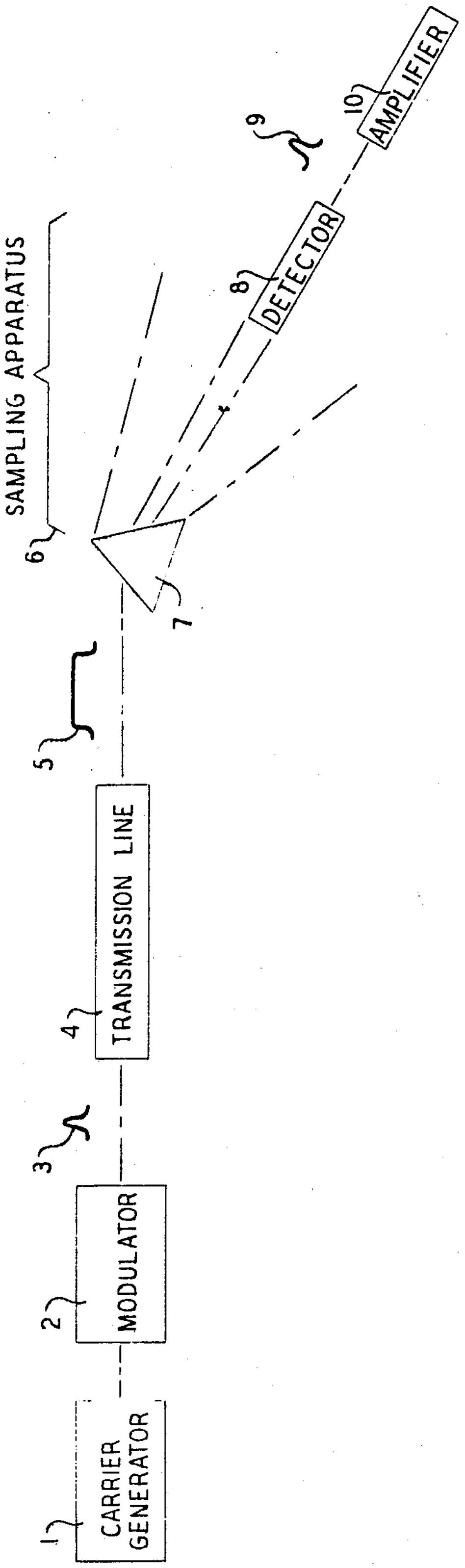
CARRIER GENERATOR
MODULATOR
TRANSMISSION LINE
SAMPLING APPARATUS
DETECTOR
AMPLIFIER
1
2
3
4
5
6
7
8
9
10

OPTICAL COMMUNICATIONS SYSTEM WITH MEANS FOR MINIMIZING MATERIAL DISPERSION

BACKGROUND OF THE INVENTION

1. Field of the Invention

The invention is concerned with apparatus and systems for optical communications in which carriers are in the wavelength range of from 500μm to 1,000 Angstrom units. Systems of concern utilize transmission media which are dispersive—i.e., in which propagation velocity is wavelength dependent.

2. Description of the Prior Art

The communications possibilities attendant on the development of the laser were generally recognized at an early date. Increasing carrier frequencies into the visible and near visible spectra carried the implicit promise of communication channels having bandwidths of a gigahertz and greater.

Developments concerned with communications aspects of optical systems have, in general, not been disappointing. Various elements required for such contemplated systems were early conceived, and, in most cases, have now been developed to where they are economically competitive with analogous elements designed for operation in more conventional longer wavelength systems. So, for example, workers now have the capability of fabricating isolators usually operating on magnetooptic principles; modulators, digital or analog, which may operate magnetooptically, electrooptically, or acoustooptically; nonlinear elements permitting step-wise frequency conversion, for example, through second harmonic generation or third harmonic generation. Parametric oscillators permitting generation of various wavelengths within a continuum from a source of specific wavelengths have been demonstrated. Detector elements, too, have been significantly improved. Such elements operating on pyroelectric principles, for example, have been shown to be responsive to high modulation frequencies on infrared carriers. Such elements, as well as the more conventional photomultipliers, operate efficiently at visible wavelengths. Deflectors useful for switching or otherwise determining routing of signals sometimes operating on acoustooptical principles have been shown to be feasible.

The laser oscillator, itself, has undergone continuing develoment. The first demonstrated oscillator, utilizing ruby as the active medium, operated only in pulsed matter and required an optical pump having the peak power of the order of 1GW. Today lasers may utilize gaseous or liquid media, as well as solids, and they may operate cw (continuous wave) or pulsed sometimes with pump power as low as 10 microwatts. More sophisticated developments include Q-switching and mode-locking, both of which have permitted generation of pulses, sometimes repetitive, of well determined length and spectral content, etc.

In general, all of the components described may be utilized in a PCM or other pulsed communications system, or alternatively may serve in a cw system. The various categories of communications systems, all familiar at longer wavelength, are adaptable to optical systems as well; and so any of the components described may be used in digital fashion and many may be adapted to systems dependent upon any of the various types of modulators—i.e., amplitude, frequency, or phase.

Of the various elements required for a communications system, probably the transmission line is furthest from commercial fruition. From the practical standpoint, transmission lines to be useful must now manifest perfection on a scale of the order of a wavelength of the carrier frequency. This limitation, in general, applies to compositional distribution and purity and also to physical dimensions, such as, surface or interface smoothness.

Significant strides have been made in the development of optical transmission lines in recent years; and glass lines, for example, constructed of silica, both single mode and multimode, now look promising. Such lines, sometimes clad with material of lowered index; sometimes evidencing parabolic distribution of index of refraction in cross section to result in a continuous focusing for different modes so that group velocities are the same for given frequencies, may show insertion losses of the order of a small number of dB/kilometer. A practical advantage of such lines is a very small cross section, generally but a few mils; and this, in certain circumstances, is of particular value from the standpoint of space requirements.

Now that insertion loss has, at least prospectively, been reduced to manageable proportions, (corresponding with bandwidths of the order of a megahertz or megabits per second for feasible repeater spacings), a bandwidth limiting mechanism, of little significance in conventional systems, has become significant. This mechanism comes about by virtue of the dispersive nature of all real media. Whereas, electromagnetic radiation regardless of wavelength travels at constant velocity in a vacuum, velocity is wavelength dependent in a real medium. Generally, in most media, velocity (always decreased relative to vacuum) is greater for longer wavelengths. Typical inorganic glassy materials show a velocity dispersion of about five percent over the visible spectrum. This dispersion results in broadening, for example, of pulses or of amplitude peaks and ultimately in overlapping. Ultimately, broadening due to frequency dispersion, for example, in a pulse system which may result in a quasi-continuous stream, makes information retrieval by conventional means impossible. As an example, the initial interpulse spacing of perhaps a nanosecond in a pulse stream introduced into a silica line from one type of laser oscillator may be sufficiently closed so as to make detection impractical in less than a kilometer. Dispersion is a more severe limitation for broader peak spectral width; and accordingly, diminishing pulse time width (or increasing frequency of amplitude modulation of a cw carrier), sometimes only because of a concomitant larger number of Fourier components, may aggravate the problem.

SUMMARY OF THE INVENTION

In accordance with the invention, the dispersion limit on bandwidth imposed by the dispersive nature of a transmission line is reduced. The essence of the invention is narrow spectral width sampling of amplitude envelopes (which, in their simplest form, may represent individual pulses of a pulse stream).

For expediency, the invention is described largely in terms of a pulse stream, although it is equally applicable to amplitude variations in a cw stream. During transmission in a real medium any pulse, even a pure mode or Fourier-limited pulse, is time-broadened. Except near absorptions, the dispersion comes about by virtue of decreasing velocity for shorter wavelength components. In a common glassy medium, pulse broadening for a typical nanosecond pulse may be greater than a nanosecond per kilometer. Ultimately—and generally within a distance of one or very few kilometers—the broadening may be so severe as to result in what appears to be a continuous stream of generally constant amplitude. In fact, however, such a stream is merely quasi-continuous; and it is characterized by a periodic variation in wavelength from the longest wavelength component to the shortest with such variations occurring cyclically in a time period identical to that of the periodicity of the original pulse sequence. Pulse information may not be retrieved from such a quasi-continuous stream by means of usual repeaters which depend upon a non-linear amplitude dependence.

In accordance with the invention, such information is retrieved by means of a detector which is sensitive to a spectral width appreciably narrower than that of the total pulse envelope content. This detector may serve as the final detector at the exit end of the transmission line and/or it may be utilized as a repeater which, used in conjunction with an amplifier, serves to regenerate the signal at appropriate intervals in the line. An alternative arrangement of some merit utilizes the spectral narrowing detector as part of a transmitter, for example, at a repeater so as to minimize dispersion during subsequent transmission. Under certain circumstances it is desirable to have spectral narrowing detectors at both ends of a transmission link (i.e., repeater to repeater).

The invention is best described in terms of an embodiment. This embodiment utilizes a prism or grating which produces an angular spread in the radiation. The radiation energy is now spatially spread with a distribution in terms of increasing or decreasing wavelength. A suitably small apertured sensing element, such as a photomultiplier, is then so placed relative to the spread energy as to admit a portion corresponding to a spectral width which is small relative to that of the original envelope.

The effect of the inventive arrangement is to reduce the dispersion limit on the bandwidth by a factor which is equal to the reciprocal of the fraction of the detected spectral width to the envelope spectral width. A typical example utilizing a nanosecond pulse produced by a Q-switched laser or a shutter-interrupted cw beam may have an envelope spectral width of the order of hundreds of wave numbers. It is practical to consider a detection arrangement which senses a spectral width of the order of a few wave numbers (or two orders of magnitude less than the envelope). For such an exemplary arrangement, the dispersion limit sets in only when the narrow detected portions of successive peaks or pulses overlap. In a typical glass delay line, such a limit may become significant only after some 50 or more kilometers. In fact, under such conditions, bandwidth may now be primarily noise-limited and may be determined on the basis of repeater economics, i.e., permitted closeness of repeater spacing and resultant signal-to-noise ratio. On this basis, a typical glass transmission line may have an effective bandwidth equivalent to a gigabit per second pulse repetition rate with repeaters at intervals spaced at six or more kilometer intervals. It is not a requirement that successive repeaters have the same spectral response. Economics of repeater spacing may somtimes dictate several wavenumbers and sometimes but a fraction. For example, a portion of a terestial line may utilize several wavenumber detectors while an underwater link may justify a relatively expensive narrow band detector.

It is significant that the invention may operate on pulses which are "pure mode" or Fourier limited. Such pulses, by definition, may not be sampled at less than the total frequency content of the envelope at the point of their generation. Passage through the transmission medium and attendant pulse broadening, however, results in a pulse which is no longer Fourier limited and which is expediently sampled in the terms set forth above.

Proper sampling in accordance with the invention results in peak power loss which is small relative to the decrease in spectral width. Typical pulses are characterized by prominent frequency modes having peak powers which are large fractions of the total envelope. Preferred sampling, regardless of location, cneters about such a mode.

It should be emphasized that, while discussion is largely in terms of pulses and sometimes in terms of digital processing of such pulses, other types of systems may beneficially be modified in accordance with the inventive teaching. Accordingly, modulation may be analog as well as digital; envelopes of concern may represent modulated portions of cw energy; and frequency or phase modulation may be imposed on either type or system. Also envelopes may be representative of but a single channel of a frequency multiplexed group (i.e., a cw system may include multiplexing prior to creation of envelopes).

BRIEF DESCRIPTION OF THE DRAWING

The FIGURE is a schematic representation of a communications system in accordance with the invention.

DETAILED DESCRIPTION

1. Terminology

It is convenient to describe the invention in terms which may be simplified or merely representative. Broad meanings to be ascribed to such terms are set forth:

Carrier Generator

Refers to the element or apparatus for generating the unmodulated carrier. This carrier may be pulsed or in the form of continuous wave (cw). Its output is characterized by a center frequency which may be processed "optically" (e.g., to result in frequency spreading through dispersion in a prism or grating). Generally, center frequency of such electromagnetic wave energy lies within the wavelength range of from the far infrared to the vacuum ultraviolet—generally from 500 $\mu$m to 1,000 Angstrom units. At the present stage in the technology, the carrier generator includes a laser, possibly in conjunction with other elements; the laser may be cw or pulsed—either Q-switched or mode-locked. In some types of pulse systems, ancillary elements may serve to periodically interrupt a cw stream and thereby produce a pulse stream. Such an element may take the form, for example, of an acoustooptic or electrooptic shutter, or more sophisticated arrangements may utilize Kerr cells or bleaching dye cells sometimes requiring polarizing elements as well. Depending largely on the nature of the transmission medium, the generator may also include a frequency shifting element, such as one operating on a non-linear principle, as for example, a second harmonic or third harmonic generator or a parametric oscillator. Discussion is largely in terms of nanosecond spacing between amplitude peaks. Where these peaks represent individual pulses of a pulse stream, such interpulse spacing may naturally result from the back and forth transit time in the laser oscillator. This spacing is characteristic of common pulse laser oscillators at this time. Where pulses are generated by a shutter mechanism, for example, of any of the types described, spacings of this order are again available by usual operation of a good quality shutter. So, for example, both electrooptic and magnetooptic modulators have been made to operate at gigahertz rates.

Where operation is pulsed, regardless of the manner in which the pulse stream is produced, pulses may or may not be Fourier limited. That is, their frequency modal content (referring to modes of sufficient amplitude to be practicably usable) may be just equal to the Fourier components required to define the time duration of the pulse envelope, although in general spectral width is one or two orders of magnitude greater than that required to satisfy the Fourier requirement—e.g., for a nanosecond pulse produced by a Q-switched Nd-glass laser may be expected to have at least 10 usable frequency modes.

Modulator refers to the element or elements responsible for superimposing intelligence information on the carrier. In simplest form, when operating with a pulse stream, the modulator may be a simple shutter which merely eliminates appropriate pulses within the stream. Still considering pulsed operation, the modulator may be multilevel and may, therefore, change the amplitude of a given pulse or pulses to any of several quantized or continuously varied values. Other modes of operation may include phase shifting of the pulse or even frequency shifting of the pulse content.

The modulator may perform any of the above functions in a cw system and so, again, modulation may be amplitude, phase, or frequency. For purposes of this discussion, it is convenient to consider modulated portions as constituting envelopes. These envelopes which, in form, are generally Lorentzian in terms of frequency distribution are identical with separated pulses insofar as dispersive effects are concerned. Accordingly, the term "envelope" is intended to encompass any information bit whether or not connected to another bit by intervening wave energy.

Description in terms of a "communications" system does not imply any particular type of communications; and while description is sometimes in terms of "intelligence information," this also implies no restriction on the modulation content. Intelligence information may take the form of voice or other sound within the audible range, or may involve data information or other intelligence not intended for direct human consumption. It is even possible that a useful system may contemplate transmission of an uninterrupted stream of pulses (or other form of envelopes), in which event the modulator as defined is not a necessary separate element and in which event the "modulation" function, if served at all, is carried out within the carrier generator.

Transmission Line refers to a real transmission line of suitable transparency and loss characteristics to effectively carry the radiative energy produced by the carrier generator for a substantial distance. For many purposes, dimensions and other characteristics are preferably such as to define a multimode line, although under certain circumstances a single mode line is permitted. The nature of the transmission line is dispersive; and like all real media, it has a refractive index at any wavelength which is greater than that of vacuum (numerically greater than one on the usual comparative basis). A common transmission line of considerable interest at this time takes the form of a glass fiber of a given index which is clad by glassy material of a somewhat lesser index. Discussion, at least illustrative, is sometimes in terms of such a line. An optimum multimode line has a variation in refractive index which is parabolic in cross section with the high value corresponding with the geometric center. Such a line is described in 22, *Applied Physics Letters* 3 (Jan., 1973). It is the nature of dispersive media, at least in low loss regions, that refractive index increases for shorter wavelength. That is, shorter wavelength components travel at a velocity which is less than that of longer wavelength components.

Sampling Apparatus refers to the element/s responsive to energy of a spectral width representing the desired fraction of that of the original envelope. The fraction may be as great as a half or as little as a tenth or a hundredth or less. Such sampling apparatus may include a spreading element such as a prism or grating operating in conjunction with a small aperture detector. The use of multilayered elements of varying refractive index designed to pass energy of the selected spectral content may be contemplated but does not generally constitute a preferred embodiment. Simple structures of such design have limited selectivity and many layered structures may be prohibitive in cost.

Other Elements are used in their general terms and are not defined. These may include amplifiers, for example, for increasing signal-to-noise ratio as in a repeater or simply for increasing peak values to those appropriate for any receiving apparatus, a Wollaston prism, for example, to permit differentiation between back and forth propagation through a single set of elements (the spreading element may be used to reconstitute), etc.

Other Terminology

It is expedient to define terms descriptive of operation. "Initial Pulse" or "Initial Envelope" generally has reference to the wave energy upon first introduction into the transmission line although it may designate the energy as introduced into the sampling apparatus where such is used at a transmission position. Dispersed or broadened "pulse" or "envelope" has reference to the information as introduced into sampling apparatus at a repeater or other receiver position. "Sampled pulse" or "envelope" refers to the energy as it leaves the sampling apparatus. As noted, such terminology may or may not refer to separated pulses or envelopes—in fact, may be descriptive of a portion of a quasi-continuous stream in which the envelope merely defines a spectral portion of such stream.

2. The Drawing

The FIGURE is a simplified schematic representation which may be regarded as a communications system or portion thereof designed in accordance with the inventive teaching. It consists of a carrier generator 1 which, as described, may include a laser oscillator provided with such ancillary equipment as to provide the type of radiation desired. Accordingly, it may include provision for Q-switching, mode-locking, pulse multiplication (e.g., via an echelon), a shutter of some type for interrupting a cw beam so as to produce a pulse stream, suitable non-linear element/s for frequency conversion, for example, to better match the transmission line, etc. The second element depicted is a modulator—which as described can operate by any of several mechanisms having sufficiently rapid response time to meet the needs of the system. This modulator generally superimposes intelligence information on the radiation emanating from the carrier generator 1.

As indicated, modulation may take any of the several forms. It may be analog or digital; it may be superimposed on a carrier (as by electrooptic modulation of a laser output) or may play a part in creating pulsed or cw modulated streams (e.g., as the biasing means for a junction laser or light emitting diode). In a sense, this element is optional, since the system is described in terms of sufficient breadth to include transmission of pulse streams or even cw energy in which "modulation" takes the form of the mere presence or absence of energy. This "modulation" function may be served by some part of the ancillary apparatus included in carrier generator 1.

While modulation is described in terms of "intelligence information," it may, in fact, come about by virtue of the intrinsic characteristics, e.g., absorption characteristics of an otherwise inert, perhaps unchanging, body. Accordingly, the "modulator" may be a temperature sensing means in which temperature is translated into a change in absorption or other characteristic which alters radiation passing therethrough. It may be a sample under spectroscopic examination, etc. Regardless of the form of energy and the form of modulation, it is convenient to depict energy emanating from the modulator as a pulse envelope 3. As discussed, this envelope is generically representative of an amplitude, frequency, or phase variation characterized by a peak in some terminology, generally evidencing a Lorentzian wavelength distribution. Envelope 3 is representative of such energy of concern regardless of whether it is connected or unconnected with other similar envelopes and regardless of whether it may superficially appear to be part of a cw stream (e.g., a continuous stream, in amplitude terms, may be characterized by a periodic variation in frequency and so may be characterized by envelopes defining assigned center frequencies). As noted spectral width may be narrowed perhaps to a Fourier limit by sampling means similar to apparatus 6 not shown at this position.

Element 4 is the transmission line which for these purposes is made of a real material. An exemplary line is optical quality glass of relatively low refractive index, 1.5 or lower, (refractive index $\eta$ is described in conventional terms as related to vacuum which is assigned the value of unity). Such line may be single mode or multimode and is generally provided with a cladding of somewhat lower index than the core for guiding purposes. As indicated, optimum structures of the multimode variety designed to minimize mode dispersion (as distinguished from frequency dispersion) may evidence a variation in index of refraction with a peak value at the geometric center of the core and with decreasing value following a parabolic function. Additional coatings may also be provided to minimize or prevent cross talk, to increase mechanical strength, etc.

Upon emerging from the transmission line, the wave energy, now depicted schematically as envelope 5, is broadened. While there is more than one broadening influence, the one of primary concern from the inventive standpoint comes about by virtue of the intrinsic dispersive nature of the medium of which the transmission line is constructed. Other influences have to do with Rayleigh and even some Raman scattering; and the larger effect of such additional broadening mechanisms is to decrease the signal-to-noise noise ratio. However, since Rayleight scattering is also frequency dependent, it is reasonably expected that even this influence will result in some periodicity in terms of frequency which results in some lessening of its deleterious influence.

Broadened pulse 5 is, of course, generically representative in the manner discussed with reference to pulse 3. The length of transmission line 4 prior to extraction of pulse 5 has to do with a variety of considerations, some economical, and these are discussed in a subsequent section. Broadened envelope 5 is next introduced into sampling apparatus 6 which is so arranged as to sense information of a spectral width appreciably narrower than that contained in envelope 5. In its simplest form, this apparatus may be sensitive to a fixed spectral portion; in more sophisticated arrangements, it may scan or be variable and it may be time dependent so as to be sensitive to phase modulated information.

Sampling apparatus 6 is, for illustrative purposes, depicted as including a spreading element 7, schematically represented as a prism but which may equally well take the form of, for example, an absorption or refractive index grating. This element produces angular displacement and spreads the energy within envelope 5, with the angular deflection being dependent upon wavelength. Sampling apparatus 6 may include means for collimation, for example, such as, a prism or grating which is oppositely oriented to spreading element 7 and may, under certain circumstances, also include means for quantizing the extracted energy—e.g., an echelon. Regardless of the nature of spreading element 7, sampling apparatus includes a small aperture element 8 denoted "detector." The effect of this small aperture device is to permit passage of energy of narrowed spectral width relative to that contained in envelope 5. The detector may simply be an aperture or may include means for converting its passed energy, for example, into electrical energy. It may, therefore, constitute or include a photomultiplier, a pyroelectric detector, a bolometer, etc. As noted sampling apparatus 6 may, in the alternative or in addition, be utilized to narrow envelopes as introduced into transmission line 4. The depicted position is intended to be representative.

Envelope energy emitted from detector 8 is schematically represented as envelope 9, again, generically representative of various types of wave energy. The final element shown in the FIGURE is an amplifier 10 which may or may not be necessary depending on the system. Where the transmission system contemplates transmission information over distances of many tens or hundreds of kilometers, spaced repeaters are required and these may take the form, for example, of elements such as 6 and 10. Amplifier 10 may be a linear or non-linear element; in the latter instance, non-linear with respect, for example, to amplitude designed to increase the signal-to-noise ratio. In such arrangement, amplifier 10 is followed sometimes by sampling apparatus such as apparatus 6, and eventually by another section of transmission line, such as, line 4; and multiple repeaters, for example, constituted of elements 6 and 10 may be required. Normally, a system is designed so as to include a final stage which may again include a sampling apparatus such as apparatus 6; and this stage, too, may include an amplifier or other apparatus for impedance matching, not shown. Amplifiers may take the form of lasers which directly amplify a detected pulse or may be oscillators which are triggered by a detected pulse.

3. Operating Limits and Characteristics

As discussed, the energy envelope introduced into the transmission line may take a variety of forms. From the standpoint of this section, however, parameters of consequence are time length, separation, and spectral content. To a large extent, a maximum bandwidth capability is increased as envelope time length decreases and as inter-envelope spacing decreases. Apparatus is readily available for generating envelopes of duration of the order of from $10^{-8}$ seconds to $10^{-12}$ seconds. Longer envelopes may be generated with present equipment, and studies now under way may yeild pulses of duration shorter than $10^{-13}$ seconds. Bandwidth for a transmission system of appreciable length is, in a large part, determined by economic considerations, notably tolerable repeater spacing. Accordingly, while the invention has been discussed largely in terms of broadening the capability of a given system, it may serve only as a cost saving means for maintaining a bandwidth already associated with a given line (by permitting operation with a lesser number of repeaters). Accordingly, presently available glass lines considered as having bandwidths of the order of megahertz (and this characterization, in turn, based on repeater intervals of the order of one or a few kilometers), may take advantage of the inventive teaching while still operating at their characteristic bandwidth (with repeater intervals now increased perhaps by an order of magnitude).

Envelope spacing is a characterization sometimes associated with envelope length; and it is retention of this spacing which, in simplest terms, defines the accepted dispersion limit on bandwidth capability. For systems of primary concern, inter-envelope spacing (always based on time intervals between half amplitude levels) should be a maximum of the order of microseconds. Minimum envelope spacing is dependent on such diverse factors as permitted repeater spacing, permitted signal-to-noise ratio, and detector aperture size. The latter is, in turn, dependnent upon the permitted spectral width of a sampled envelope. In terms of the invention, the factor of primary concern is the distance over which envelope integrity may be maintained to the extent necessary to permit sampling by the inventive means; and this, of course, in turn assumes that the limiting condition is, in fact, the inherent braodening due to the dispersive nature of the line. (Practical line materials may be expected to have a dispersion of at least 1 percent over the visible spectrum, i.e., 0.3 to 0.7$\mu$m.) For a typical glass line which may evidence a dispersion of approximately 5 percent over the entirety of visible spectrum, spectral sampled envelopes of the width of three wave numbers produced by degradation of sequential introduced envelopes spaced at a nanosecond may be retrieved at distances as great as about 60 kilometers. In principle, the ability to sample over so narrow a spectral width may be precluded by the nature of the original envelope. So, for example, if the original envelope is theoretically single mode (or Fourier limited), e.g., if its spectral content does not exceed the frequency components as calculated from the Fourier equation, see Jenkins and White "Fundamentals of Optics" McGraw Hill (1957), p. 221, sampling is precluded (without envelope broadening) at the intial end of the line and would be permitted only as an inverse function of spreading due to dispersion.

However, in practice, envelopes produced by usual generating apparatus are generally characterized by a spectral content which may be one or two or more orders of magnitude larger than the Fourier requirement for defining the envelope. Under such circumstances, spectral width of the sampled envelope may be determined largely by apparatus limitations. Use of available prisms and gratings permits ready discrimination of sample envelopes having a spectral width of a small fraction or, with decreasing expense of one or a few wave numbers.

As noted, envelope sharpening in accordance with the invention may be of sufficient efficacy to remove frequency dispersions as the limiting condition on bandwidth and may result in a system in which signal-to-noise ratio controls. Calculations of signal-to-noise ratio and related conditions are interdependent on a number of factors peculiarly associated with given systems under consideration and are best left to the design engineer. The following discussion is, therefore, illustrative only.

Glass lines manifesting insertion loss of about 2dB/kilometer at near infrared wavelengths have been produced. Lines having an insertion loss of about 1dB/kilometer for some reasonable wavelength are likely to emerge. On the assumption that net signal may be lowered 50dB or more, (usual designs provide for signal-to-noise ratios equivalent to −70dB or less), disregarding peak power loss due to sampling which for prominent modes may be small, and still assuming loss to be due to creation of white noise, repeater spacings of 25 kilometers or more are indicated. Sampling of a 3 $cm^{-1}$ spectral width envelope need be carried out only every 50 or 60 kilometers (assuming 5 percent dispersion over the visible spectrum).

Assuming the carrier generating apparatus to include a laser so that spectral content of the envelope corresponds with real modes, it may be contemplated that the envelope at every stage is characterized by distinct spectral structure. Optimum utilization of the inventive concept would indicate that sampling should center about a predominant mode—possibly that mode corresponding with the center frequency of the laser which may be expected to have a peak amplitude approaching or even equal to that of the total envelope. Placement of the sampling apparatus so as to be responsive to such a predominant mode may be calculated from first principles or may be determined empirically merely by angularly displacing the apparatus to a position of peak response.

What is claimed is:

1. Optical communications system including generating means comprising first means for producing electromagnetic wave energy with a center frequency within the wave length range of 500$\mu$m to 1,000 Angstrom units, including second means for modulating such energy so as to alter a parameter of such wave energy, said parameter being selected from the group consisting of amplitude, frequency, and phase, said first and second means being adapted for generating envelopes of electromagnetic wave energy, said envelopes being definable by a spectral width having a length measurable in time, said length corresponding with at least one of the said parameters; a transmission line of a real medium evidencing a variation in velocity dependent upon wavelength; means for introducing envelopes of electromagnetic wave energy as produced by said first and second means into said line at a first position; and at least one detector responsive to envelopes extracted from said transmission line at a position in the transmission line spaced from the said first position, characterized in that at least one sampling means is provided for extracting sample envelopes of electromagnetic wave energy from unsampled envelopes, said samples envelopes being characterized by a spectral width which is less than but contained within that of the said unsampled envelopes as produced by said first and second means;

whereby the unsampled pulse during traversal within the said real medium is increased in time length due to the said wavelength dependent velocity variation and a sampled pulse of lessened time length is produced.

2. System of claim 1 in which the said parameter is amplitude and the said sampling means has a spectral response which has a maximum half as great as that of the envelopes before sampling.

3. System of claim 2 in which the said first means includes a laser.

4. System of claim 3 in which the said laser has a pulsed output.

5. System of claim 3 in which the said sampling means has a spectral response which centers about a wavelength defining a predominant wavelength mode of the said laser.

6. System of claim 5 in which the spectral response of the said sampling means is a maximum of one-tenth that of the unsampled envelopes.

7. System of claim 6 in which a said sampling means is at least a portion of a detector.

8. System of claim 7 in which the said detector includes an amplifier for increasing the amplitude of sampled envelopes.

9. System of claim 8 in which the said amplifier includes a laser.

10. System of claim 9 in which the said laser is a laser oscillator.

11. System of claim 1 in which a said sampling means is included in the said generating means.

12. System of claim 11 in which a said detector comprises a said sampling means.

13. System of claim 1 including at least two said sampling means and at least two said detectors, at least one of said detectors including an amplifier for increasing the amplitude of sampled envelopes.

14. System of claim 1 in which a said detector is at least part of a terminal receiver at the end of the said transmission line.

15. System of claim 1 in which unsampled envelopes as introduced into the said transmission line from the said generating means are separated by an interval which is a maximum of about $10^{-6}$ second.

16. System of claim 1 in which the unsampled envelopes have a spectral content only sufficient to satisfy the Fourier requirement for defining time duration.

17. System of claim 1 in which the spectral content of unsampled envelopes exceeds the Fourier requirement for defining time duration by at least one order of magnitude.

18. System of claim 1 in which the said detector includes at least one prism or grating for producing an angular spread in the extracted envelopes in terms of wavelength, and in which the said detector is provided with an aperture of such physical dimensions as to limit its response to the desired narrowed spectral width.

19. System of claim 1 in which the said transmission line has a frequency dispersion of at least 1 percent over the wavelength range of from 0.3 to 0.7 $\mu$m.

20. System of claim 1 in which the spectral response of a said sampling means is a maximum of about ten wave numbers.

21. System of claim 20 in which the spectral response of a said sampling means is a small fraction of a wave number.

* * * * *

UNITED STATES PATENT OFFICE
CERTIFICATE OF CORRECTION

PATENT NO. : 3,840,738

DATED : October 8, 1974

INVENTOR(S) : George S. Indig and Peter M. Rentzepis

It is certified that error appears in the above-identified patent and that said Letters Patent are hereby corrected as shown below:

Column 4, line 20, change "cneters" to read --centers--;

line 29, change "or" (second occurrence) to read --of--.

Column 8, line 13, change "signal-to-noise" to read --signal-to-white--;

line 14, change "Rayleight" to read --Rayleigh--.

Column 9, line 16, change "Characteristics" to read --Characterizations--;

line 62, change "braodening" to read --broadening--.

Column 11, line 22, change "samples" to read --sampled--.

Signed and sealed this 24th day of June 1975.

(SEAL)
Attest:

RUTH C. MASON
Attesting Officer

C. MARSHALL DANN
Commissioner of Patents and Trademarks